(No Model.) 2 Sheets—Sheet 1.

G. H. TAYLOR.
REEL FOR WINDING TRIMMINGS, RUCHINGS, &c.

No. 425,392. Patented Apr. 8, 1890.

WITNESSES:
Gustave Dietrich
T. F. Bourne

INVENTOR
George H. Taylor.
BY Briesen, Steele & Knauth
ATTORNEYS (No Model.) 2 Sheets—Sheet 2.

G. H. TAYLOR.
REEL FOR WINDING TRIMMINGS, RUCHINGS, &c.

No. 425,392. Patented Apr. 8, 1890.

WITNESSES:
Gustave Dieterich
T. F. Bourne

INVENTOR
George H. Taylor
BY Briesen, Steele & Knauth
ATTORNEYS.

UNITED STATES PATENT OFFICE.

GEORGE H. TAYLOR, OF NEW YORK, N. Y.

REEL FOR WINDING TRIMMINGS, RUCHINGS, &c.

SPECIFICATION forming part of Letters Patent No. 425,392, dated April 8, 1890.

Application filed November 4, 1889. Serial No. 329,204. (No model.)

*To all whom it may concern:*

Be it known that I, GEORGE H. TAYLOR, a resident of New York city, in the county and State of New York, have invented an Improved Reel for Winding Trimmings, Ruchings, and the Like, of which the following is a specification, reference being had to the accompanying drawings, forming part hereof, wherein—

Figure 1:
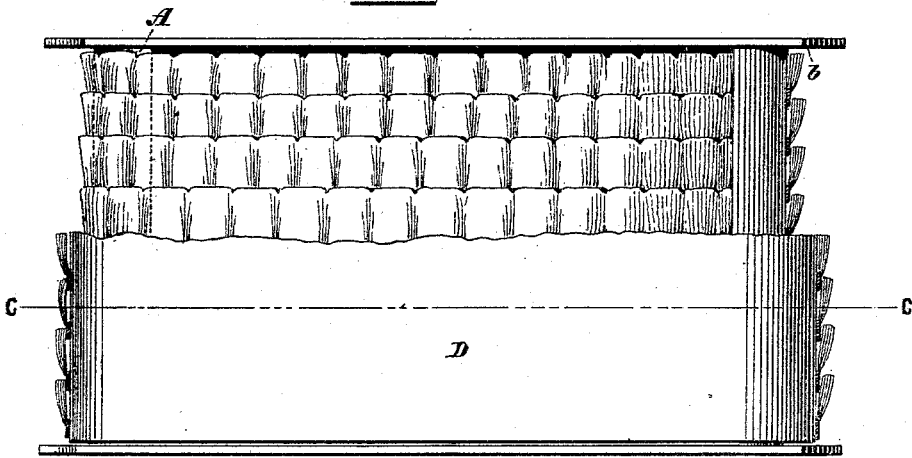
Figure 2:
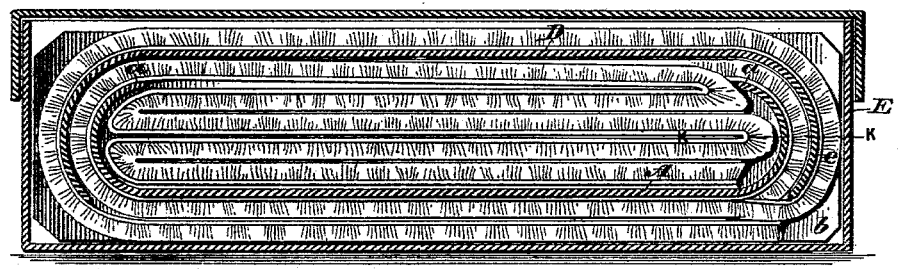
Figure 3:
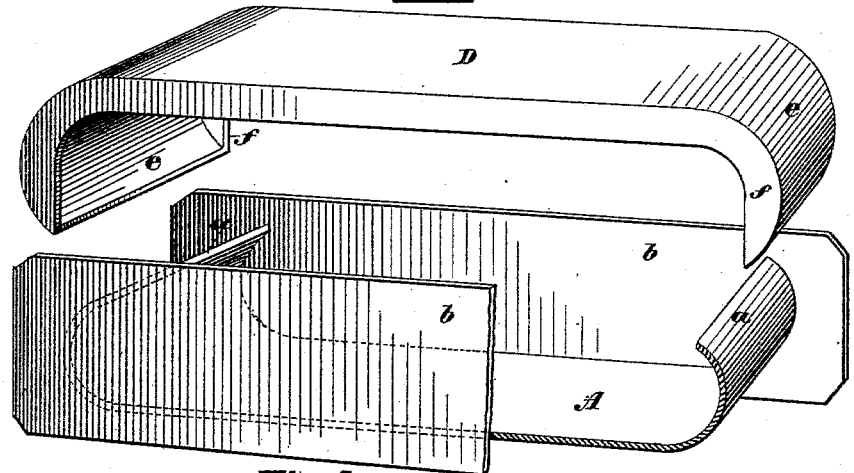
Figure 4:
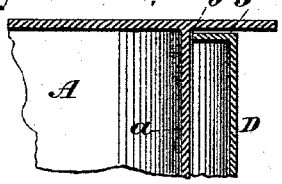
Figure 5:
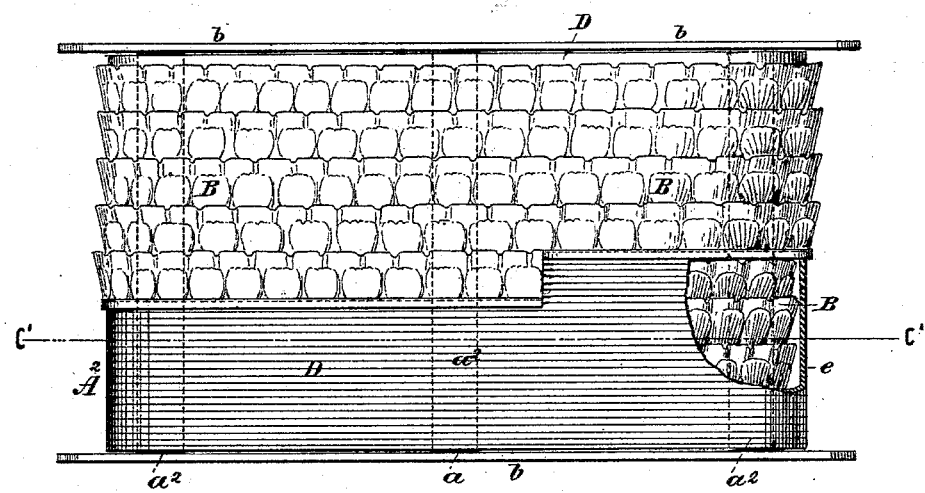
Figure 6:
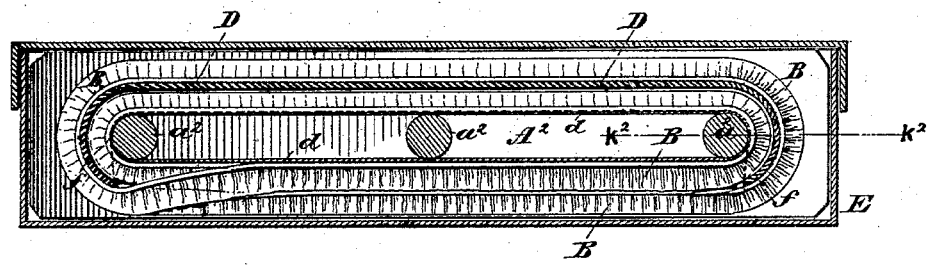
Figure 7:
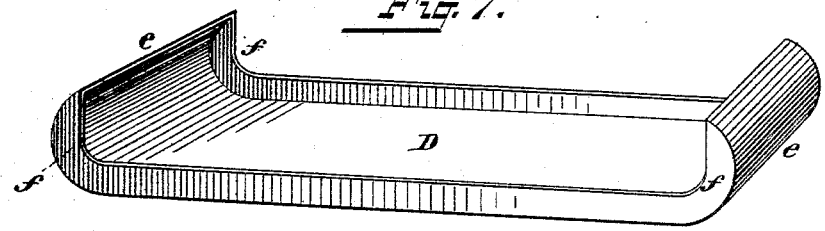
Figure 8:
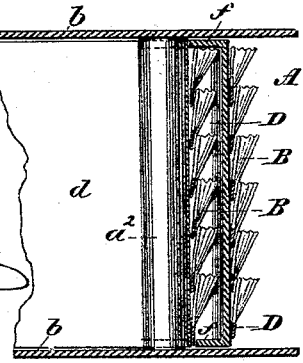

Figure 1 is a face view of my improved reel, part being broken away. Fig. 2 is a longitudinal section of the same on the line $c\ c$, Fig. 1. Fig. 3 is a detail perspective view, partly broken, showing the reel and detachable shield used on the reel. Fig. 4 is a detail horizontal section on the line $k\ k$, Fig. 2. Figs. 5 and 6 are views similar to Figs. 1 and 2, respectively, showing the detachable shield applied to an ordinary reel. Fig. 7 is a perspective view of the detachable shield, and Fig. 8 is a detail section on the line $k^2\ k^2$, Fig. 6.

The object of this invention is to so construct a reel for winding ruchings and other trimmings and the like that several layers of such trimmings may be applied without one layer crushing the other.

To this end my invention consists in the novel details of improvement and the combinations of parts that will be more fully hereinafter set forth, and then pointed out in the claims.

In the drawings, the letter A indicates an open box having closed ends and sides, within which trimming, ruchings, or the like B is to be placed, part of the trimming being also wound around the box, whereby the outer layer of trimming is supported. The open box A also has projecting side flanges $b\ b$, which serve to prevent the outer layer of trimming from slipping off the box.

The above arrangement constitutes a reel or the like, upon which ruching or the like can be wound as well as laid within the box. The ruching B is laid longitudinally back and forth in the box until said box is about full, when the ruching B is wound around this reel or box in the usual manner, until one layer thereof covers said reel or box. If more ruching is to be wound, I take a shield D (shown more clearly in Figs. 3 and 7) and place it onto the reel or box. This shield D has curved ends at $e$ and flanges $f$ at or near these curved ends. In fact, the flanges may extend from end to end as shown. The length of the shield is such that the space between its flanges is equal about to the distance between the ends $a$ of the box or reel proper, or, in other words, the length of the box A. When this shield D is placed on the reel, having one layer of ruching or the like thereon, its flanges $f$ bear against the upturned sides $a$ of the box, and keep the shield thus at such a distance from the box or reel proper as not to interfere with or crush the ruchings or the like that are wound on said box or reel. The shield being thus applied the ruching or other trimming is continued to be wound around said shield, as in Figs. 2 and 6, the shield serving to form a support for the second outer layer and preventing the outer layer from in any way interfering with the inner or the first layer. After this outer layer has been applied to the shield so as to cover it, another shield of the same character, but proportionately different in size, may be applied to the first shield, and so on indefinitely.

The shield D may, if desired, be used with an ordinary reel $A^2$, as in Figs. 5, 6, and 8. In said figures the cross-bars $a^2$ are secured at their ends to the flanges $b\ b$, as usual. Over the cross-bars $a^2$ a covering of paper or pasteboard $d$ may be laid, as in Fig. 6. With this arrangement the ruching B is first wound around the reel $A^2$ and then the shield D placed over the same, the ruching being then wound around the shield and reel as before explained.

Figs. 2 and 6 represent the reel A, having the shield D within an outer box E, in which the goods are usually packed for transportation.

Having now described my invention, what I claim is—

1. The open box A, having projecting side flanges $b$, rounded ends, closed bottom, and open top, substantially as described, to constitute a receptacle for an inner layer and a support for an outer layer of trimming or fabric B, substantially as described.

2. The combination of a reel with the detachable shield D, having curved ends e, side flanges f, and open face, substantially as herein shown and described.

3. The box A, having flanges b b, rounded ends, and open face, combined with the detachable shield D, having curved ends e, side flanges f, and open face, as and for the purpose specified.

GEORGE H. TAYLOR.

Witnesses:
MARY HUBER,
FRED A. KURSHEEDT.